(12) United States Patent
Cotton et al.

(10) Patent No.: US 11,079,024 B1
(45) Date of Patent: Aug. 3, 2021

(54) VALVE CAVITY ISOLATION SEAT

(71) Applicant: Patriot Research Center, LLC, Houston, TX (US)

(72) Inventors: Craig Cotton, Cypress, TX (US); Weston Zwiacher, Houston, TX (US)

(73) Assignee: Patriot Research Center, LLC, Houston, TX (US)

( * ) Notice: Subject to any disclaimer, the term of this patent is extended or adjusted under 35 U.S.C. 154(b) by 0 days.

(21) Appl. No.: 16/862,096

(22) Filed: Apr. 29, 2020

(51) Int. Cl.
*F16K 3/20* (2006.01)
*F16K 3/02* (2006.01)

(52) U.S. Cl.
CPC ........... *F16K 3/205* (2013.01); *F16K 3/0227* (2013.01); *F16K 3/0236* (2013.01)

(58) Field of Classification Search
CPC . F16K 3/20; F16K 3/205; F16K 3/202; F16K 3/0227; F16K 3/0236; E21B 34/00; E21B 34/06; E21B 43/26; E21B 43/2605; E21B 43/2607; E21B 43/27
USPC .......................................... 251/159, 162–163
See application file for complete search history.

(56) References Cited

U.S. PATENT DOCUMENTS

| | | | | |
|---|---|---|---|---|
| 2,664,918 A | * | 1/1954 | Hamer | F16K 3/312 138/94.3 |
| 2,854,209 A | * | 9/1958 | Erwin | F16K 3/205 251/159 |
| 2,946,349 A | * | 7/1960 | Hamer | F16K 3/205 138/94.3 |
| 3,254,873 A | * | 6/1966 | Knox | F16K 5/201 251/171 |
| 3,297,299 A | * | 1/1967 | Anderson | F16K 3/0227 251/327 |
| 3,669,149 A | * | 6/1972 | Guichon | F16K 3/205 137/625.48 |
| 3,890,991 A | * | 6/1975 | Grove | F15B 1/02 137/1 |
| 4,018,420 A | * | 4/1977 | Muller | C21B 9/12 251/172 |
| 4,377,273 A | * | 3/1983 | Beson | F16K 3/202 251/210 |
| 4,513,947 A | * | 4/1985 | Amend | F16K 3/20 251/159 |
| 4,566,671 A | * | 1/1986 | Beson | F16K 3/207 251/159 |
| 4,878,651 A | * | 11/1989 | Meyer, Jr. | F16K 3/0236 251/172 |
| 4,923,171 A | * | 5/1990 | Beson | F16K 3/205 251/159 |
| 5,320,327 A | * | 6/1994 | Beson | F16K 3/205 251/172 |

(Continued)

FOREIGN PATENT DOCUMENTS

| | | | | |
|---|---|---|---|---|
| CN | 108692049 A | * | 10/2018 | |
| CN | 108692050 A | * | 10/2018 | |
| GB | 679209 A | * | 9/1952 | F16K 3/20 |

*Primary Examiner* — David Colon-Morales
(74) *Attorney, Agent, or Firm* — The Kubiak Law Firm PLLC

(57) ABSTRACT

A gate valve seat seal includes a two-piece seat arranged so that an inner seat moves within an outer piece. The inner seat is moved by a flange where as the flange moves radially inwards the inner seat is moved axially to seal the gate. As the flange moves radially outwards the inner seat is moved axially out of sealing contact with the gate.

5 Claims, 3 Drawing Sheets

(56) References Cited

U.S. PATENT DOCUMENTS

| | | | | |
|---|---|---|---|---|
| 5,445,359 A * | 8/1995 | Beson | ............ | F16K 3/205 |
| | | | | 251/159 |
| 5,624,101 A * | 4/1997 | Beson | ............ | F16K 5/201 |
| | | | | 251/172 |
| 5,927,684 A * | 7/1999 | Marx | ............ | F16K 3/20 |
| | | | | 251/203 |
| 7,780,143 B2 * | 8/2010 | Shibata | ............ | F16K 3/20 |
| | | | | 251/203 |
| 8,327,866 B2 * | 12/2012 | Parks, Jr. | ............ | F16K 3/0236 |
| | | | | 137/15.23 |
| 8,662,473 B2 * | 3/2014 | Comeaux | ............ | F16K 3/20 |
| | | | | 251/174 |
| 8,936,701 B2 * | 1/2015 | Lah | ............ | F16K 3/0281 |
| | | | | 202/242 |
| 9,784,373 B2 * | 10/2017 | Puetz | ............ | F16K 31/1225 |
| 10,197,166 B2 * | 2/2019 | Emmanuel | ............ | F16K 3/0218 |
| 10,451,187 B2 * | 10/2019 | Roberts | ............ | F16K 3/20 |
| 10,663,068 B2 * | 5/2020 | Puranik | ............ | F16K 3/186 |

\* cited by examiner

US 11,079,024 B1

VALVE CAVITY ISOLATION SEAT

BACKGROUND

A typical oil and gas well generally has a wellhead with a frack tree at the surface. The frack tree generally consists of one or more large bore gate valves that allow pumping high-pressure fluids, including proppant, into the wellbore. High-pressure fluid, when injected into a hydrocarbon bearing formation, causes fissures in the formation rock that radiate out from the wellbore. However, when the high-pressure fluid is removed fissures close. When proppant is injected into the formation along with the high-pressure fluid then as the fissures are formed proppant is also forced into the fissures. When the pressure is removed from the fluid the proppant remains within the fissures. Generally, the proppant has a relatively small diameter in order to be carried into the fissures and is relatively high compressive strength such that when the pressure is removed the proppant that is remained within the fissures are prevented from closing by the proppant within the fissures. Material such as sand and ground walnut shells are commonly used. The fissures are then able to provide channels for fluids to move from the formation into the wellbore.

Today a single well may see 40 or more pumping cycles in order to fracture each hydrocarbon bearing formation within the well. A typical frack job may require over 10 million barrels of water and several hundred thousand pounds of proppant. During the frack job each of the frack tree valves is in a wide-open position with high pressure sand or other profit laden fluid being injected through it. While the operator is pumping the high-pressure, on the order of 12,000 15,000 psi, sand laden fluid is forced into every small opening from the top of the frack tree to the bottom of the well including any nooks or crannies in the large bore valves that make up the frack tree.

Generally, the large bore valves are gate valves. Each of the gates sits between a pair of seats. When the gate transits between an open and closed position the gate floats between each of the seats. When a gate is closed pressurized fluid will push against the gate causing the gate to land on the seat on the opposite side of the pressurized fluid. When the gate lands on the seat a seal is formed to prevent fluid flow past the gate and seat. However on the side of the gate towards the fluid there is a gap between the seat and the gate. This gap allows pressurized fluid to flow around the gate and into the space where the gate moves when it's open. The pressurized fluid is generally proppant laden therefore the proppant moves with the fluid into the space behind the gate. When enough proppant moves into the space behind the gate the gate is no longer operable as is no room behind the gate for the gate to move off the seat and into its open position. Additionally many instances the proppant which may be sand is highly abrasive and a small amount of the abrasive proppant will remain on the fluid side of the gate between the gate in the seat such that when the gate slides open the abrasive proppant drags across the gate and the seat causing scratches and abrasions into the surface of both the gate and the seat which in turn degrades the valves ability to seal. Therefore, in order to keep the valves operable as long as possible, after every frack a single zone in a multizone well, the valve is closed and the fracking operation is moved to an adjacent well. Once the frack operation is moved to an adjacent well grease is applied to the valve in an effort to push the proppant out of the valves' nooks and crannies and in particular the area behind the gate. Generally the grease is also very viscous and is used to try to seal the gates in order to prevent leaking which allows a proppant damaged valve to continue to operate at some degraded capacity until it reaches a point at which it must be replaced.

SUMMARY

In an embodiment of the current invention a seat is equipped with a movable portion that is allowed to move axially to contact the gate thereby preventing the migration of proppant into nooks and crannies or into the area between the seat and the gate. However the seat is constrained such that it can move axially in order to contact the gate or to be removed from contact with the gate only when the gate is stationary and in the fully closed position. More particularly, a seat has two concentric pieces an inner seat and an outer seat. Preferably, the outer seat mates to the valve body while guiding and sealing the inner seat while allowing the inner seat to move axially in response to an applied force. A stem slides the gate in or out of position once the gate is fully closed. The stem may continue to move a small distance usually about 0.060 inches to move a flange the small distance. A portion of the flange fits within at least one slot in the second seat and is angled so that as the flange moves radially across the slot the angle applies force in an axial direction causing the second seat to move axially towards the gate in order to contact and seal against the gate. In many instances the slot in the second seat will have an angle that matches the angle of the flange. Generally the second seat is only required to move about 0.010 inches in order to seal against the gate.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
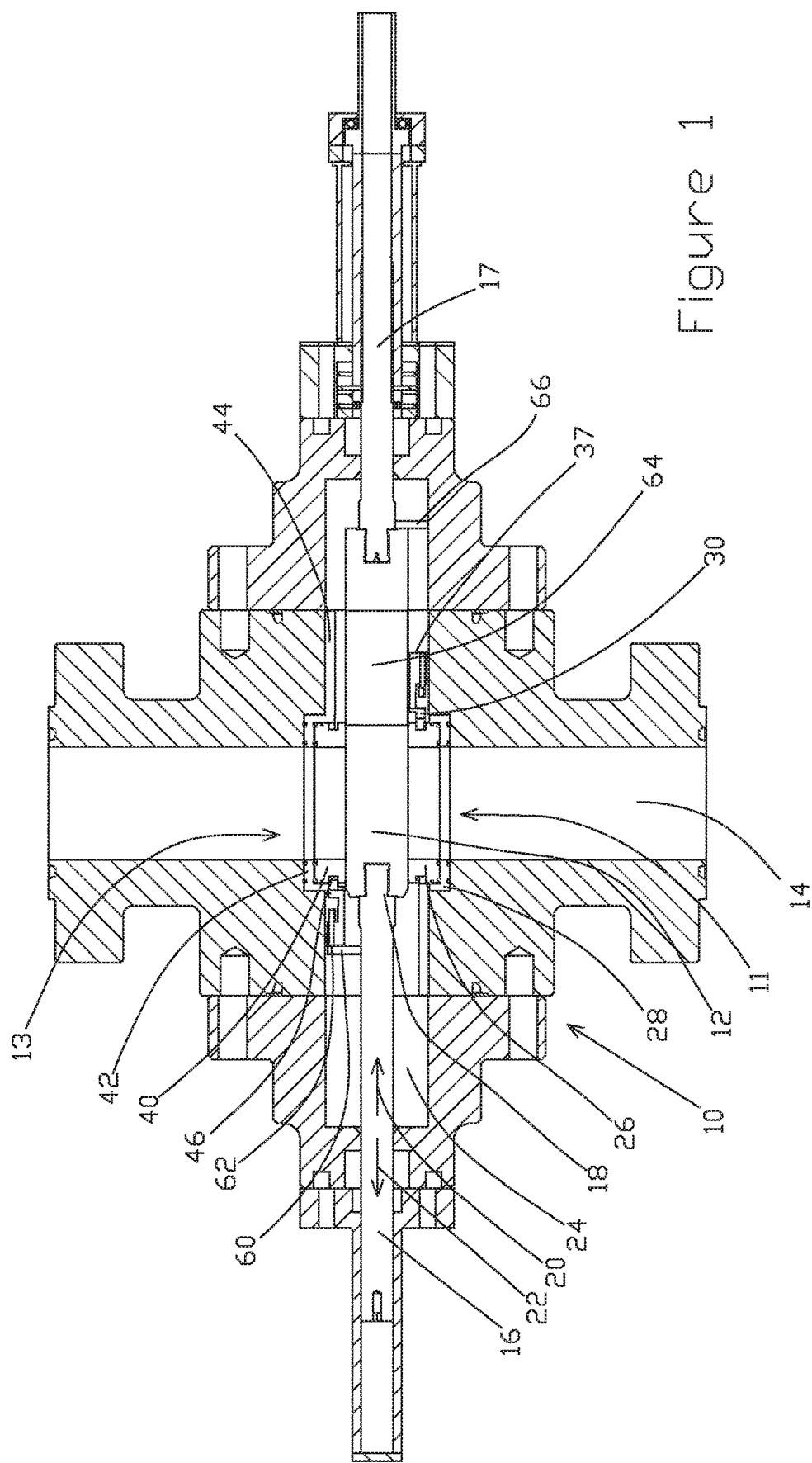
FIG. 1 depicts a cutaway view of a gate valve having a first mechanical isolation valve and a second mechanical isolation valve.

FIG. 1 depicts a cutaway view of a gate valve 10 having a first mechanical isolation valve 11 and a second mechanical isolation valve 13. The gate valve 10 has a gate 12. Where the gate 12 has a valve bore 14. When the gate 12 is in its closed position valve bore 14 is blocked by gate 12. Gate 12 is generally moved from its closed position, as shown in FIG. 1, to an open position by stem 16. Where stem 16 is attached to the gate 12 at location 18. Usually stem 16 has an at least partially threaded shaft so that as stem 16 is rotated stem 16 will move along the main axis of stem 16 in turn moving gate 12. Generally, but depending upon the thread pattern as stem 16 is rotated in a clockwise position stem 16 moves along the main axis of stem 16 in the direction of arrow 20. Again depending upon the thread pattern of the at least partially threaded shaft 16 as stem 16 is rotated in a counterclockwise position stem 16 moves along the main axis of stem 16 in the direction of arrow 22. When stem 16 is rotated counterclockwise gate 12 is moved into the void 24 such that gate 12 is in an open position and the through bore 11 is open.

The gate valve 10 has a first mechanical isolation valve 11. The first mechanical isolation valve 11 has an inner seat 26, an outer seat 28, and a flange 30. Flange 30 partially fits within groove 32. Groove 32 is formed on an outer portion of inner seat 26 and an upper surface of outer seat 28. Flange 30 has a taper that generally matches the taper of groove 32 so that as flange 30 moves in the direction of arrows 20 or 22 inner seat 26 will move within outer seat 28 in a coaxial direction to inner bore 14. As the inner seat 26 moves upwards in the direction of arrow 32 inner seat 26 will contact the lower surface of gate 12. Preferably the inner seat 26 contacts the lower surface of gate 12 with enough force to form a metal metal seal preventing fluids and solids from passing into the area such as void 24 or the areas between the gate 12 and the inner seat 26

The gate valve 10 may include a second mechanical isolation valve 13. The second mechanical isolation valve 13 has an inner seat 40, an outer seat 42, and a flange 44. Flange 44 partially fits within groove 46. Groove 46 is formed on an outer portion of inner seat 40 and a portion of outer seat 42. Flange 44 has a taper that generally matches the taper of groove 46 so that as flange 44 moves in the direction of arrows 20 or 22 inner seat 40 will move within outer seat 42 in a coaxial direction to inner bore 14. In some cases the taper may be on the portion of the inner seat that forms a portion of the groove, while in other cases the taper may be on the portion of the outer seat that forms the groove, or the taper may be on both the inner seat and the outer seat with a match taper on the appropriate side or sides of the flange. As the inner seat 40 moves downwards inner seat 40 will contact the upper surface of gate 12. Preferably the inner seat 40 contacts the upper surface of gate 12 with enough force to form a metal to metal seal preventing fluids and solids from passing into the area such as void 24 or the areas between the gate 12 and the inner seat 40. Preferably, but not in all embodiments, sufficient axial force is provided by the interaction of groove 46 and flange 44 to force inner seat 40 into contact with gate 12 forming a metal metal seal between inner sleeve 40 and gate 12 but also to push gate 12 into inner seat 26 of the first mechanical isolation valve 11 in order to form a metal metal seal between the lower surface of gate 12 and the face of inner seat 26 of the first mechanical isolation valve 11. Generally the flange 44 and the groove 46 are tapered to form a wedge and seat system in order drive the inner seat 40 in a downward direction coaxially to the bore 14.

Preferably the seats are actuated, that is moved in or out of contact with the gate, by the stem moving radially inwards or outwards. In most cases the stem may be moved in or out by having the stem rotated such that a thread of the outer surface of the stem will interact with a thread on the inner surface of the valve so that when the stem is rotated the threads will move the stem inwards or outwards depending upon the direction of rotation of the stem and the direction of the threads. In other cases the stem may be moved in order outward electrically, pneumatically, or hydraulically. More specifically and in the preferred embodiment, with reference to the second mechanical isolation valve 13, the stem 16 will be attached to a plate 60. The plate 60 is generally attached to an end 62 of flange 44. The stem 16 while attached to plate 60 is allowed to rotate within plate 60. When closing the gate 12 stem 16 may be rotated clockwise depending upon the orientation of the threads such that stem 16 moves in the direction of arrow 20 or radially inward. As gate 12 reaches the limit of its travel stem 16 is allowed to travel an additional length such as 60 thousandths of an inch. The additional travel further moves flange 44 radially inward such that the taper of groove 46 and flange 44 moves the inner seat 40 axially towards gate 12 such that inner seat 40 contacts gate 12 to form a metal metal seal.

When opening gate 12 stem 16 is rotated counterclockwise such that stem 16 moves in the direction of arrow 22 or radially outward. As stem 16 begins to move radially outward gate 12 does not initially move. The radially outward movement of stem 16 initially engages flange 44 to move radially outward such that the taper between groove 46 and flange 44 moves inner seat 40 axially away from gate 12 such that inner sleeve 40 is no longer in contact with gate 12. Once flange 44 has moved radially outward a sufficient amount to release and receive 40 from gate 12 further movement of stem 16 in the direction of arrow 20 moves the now released gate 12 into the void 24 thereby allowing the open bore section 64 of gate 12 to become coaxial with bore 14 thereby allowing passage past gate 12 in through bore 14.

With the open bore section 64 of gate 12 in position to allow passage past gate 12 within bore 14 stem 17 is further moved in the direction of arrow 22 such that plate 66 is moved an additional amount usually about 60 thousandths of an inch in the direction of arrow 22 to push flange 30 within groove 32 the additional 60 thousandths of an inch as well. Flange 30 and groove 32 preferably but not always have a matching taper such that as flange 30 moves radially inwards groove 32 forces inner seat 26 axially upwards against gate 12 to form a metal metal seal between inner seat 26 and gate 12. Preferably, but not in all embodiments, sufficient axial force is provided by the interaction of groove 32 and flange 30 to force inner seat 26 into contact with gate 12 forming a metal metal seal between inner sleeve 26 and gate 12 but also to push gate 12 into inner seat 40 of the second mechanical isolation valve 13 in order to form a metal metal seal between the lower surface of gate 12 and the face of inner seat 40 of the second mechanical isolation valve 13.

When closing gate 12 stem 17 is rotated clockwise such that stem 17 moves in the direction of arrow 20 or radially outward. As stem 17 begins to move radially outward gate 12 does not initially move. The radially outward movement of stem 16 initially engages flange 30 to move radially outward such that the taper of groove 32 and flange 30 moves inner seat 26 axially away from gate 12 such that inner sleeve 26 is no longer in contact with gate 12. Once flange 30 has moved radially outward a sufficient amount to release inner seat 26 from gate 12 further movement of stem 17 in the direction of arrow 22 moves the now released gate 12.

Figure 2:
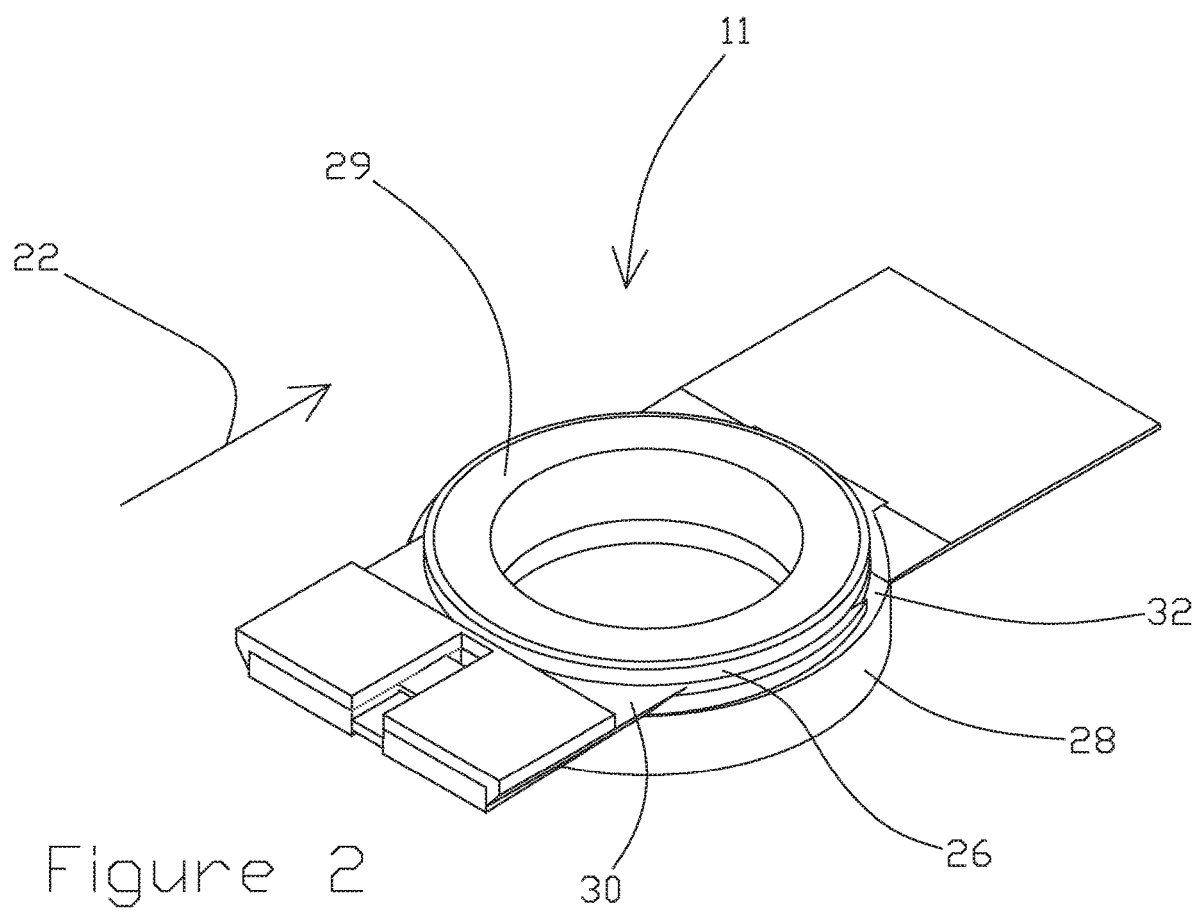
FIG. 2 depicts an orthogonal view of a mechanical isolation valve.

FIG. 2 depicts an orthogonal view of the mechanical isolation valve 11 of FIG. 1. The mechanical isolation valve 11 includes the outer seat 28 and the inner seat 26. Preferably the radially inward surface of the inner seat 26 and the radially outward surface of the outer seat 28 have seals in between the inner seat 26 and the outer seat 28 in order to prevent fluids or other materials from passing between the two seats. Generally, the outer seat 28 is fixed within a cavity adjacent to the gate 12 in the frak valve 10, while the inner seat 26, when installed in the frak valve 10, has a limited ability to move in an axial direction within the outer seat 28. When installed in the frak valve 10 the inner seat 26 is constrained within the outer seat by flange 30. While flange 30 limits the amount of movement allowed to inner seat 26, the flange 30 also provides the driving force necessary to move the inner seat in an axial direction such that the inner seat's 26 surface 29 is moved into contact with gate 12. Generally, flange 30 is moved in the direction of arrow 22 such that the tapered surface of the flange 30 acts in conjunction with the groove 32 to move the surface 29 of inner seat 26 axially away from outer seat 28.

Figure 3:
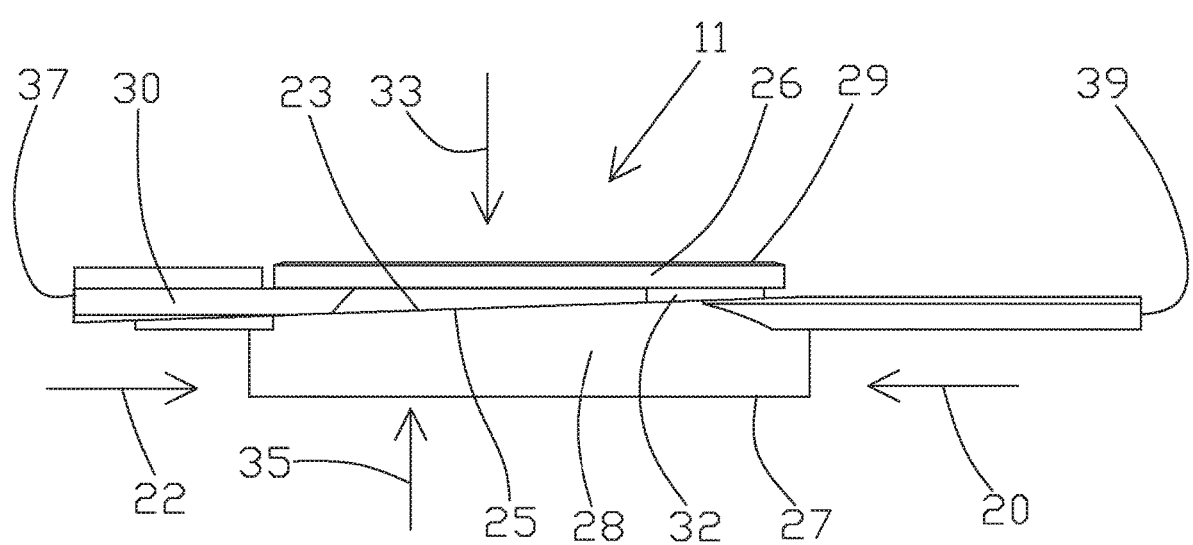
FIG. 3 depicts a side view of a mechanical isolation valve.

FIG. 3 depicts a side view of the mechanical isolation valve 11 in FIG. 1. Mechanical isolation valve 11 has an outer seat 28, and inner seat 26, and a flange 30. Generally, the outer seat 28 is fixed within a cavity adjacent to gate 12 while the inner seat 26 is coaxial with outer seat 28 and is able to move a limited amount in the directions of arrows 33 and 35. Generally the inner seat 26 is moved when the plate 66 attached to stem 17 contacts shoulder 37 of flange 30 and continues to provide force against shoulder 37 to drive flange 30 in the direction of arrow 22 within the groove 32. As flange 30 moves in the direction of arrow 22 the tapered surface 25 of groove 32, which in turn is part of inner seat 26, interacts with tapered surface 23 of flange 30. As flange 30 is moved further in the direction of arrow 22 the tapered surfaces 23 and 25 created force in the direction of arrow 33 in turn moving inner seat 26 in the direction of arrow 33. The inner seat 26 continues to move in the direction of arrow 33 until the upper surface 29 contacts gate 12 thereby forming a seal with gate 12. Preferably inner seat 26 moves to contact gate 12 and after the initial contact with gate 12 continues to move inner seat 26 and gate 12 until gate 12 contacts the inner seat of isolation valve 13 thereby forming metal to metal seals on both upper and lower sides of gate 12 whether gate 12 is in the open position to allow fluid flow through bore 14 or in the closed position to prevent fluid flow through bore 14.

In, turn in order to move the upper surface 29 of inner seat 26 out of contact with gate 12 so that gate 12 may be moved between an open position and a closed position and opposing plate such as plate 60 may be moved by stem 16 in the direction of arrow 20. As plate 60 contacts shoulder 39, the opposite of shoulder 37 and flange 30, stem 16 through plate 60 will provide force to move flange 30 in the direction of arrow 20. As flange 30 moves within groove 32 the tapered surfaces 23 and 25 will move to inner seat 26 to move in the direction of arrow 35 and out of contact with gate 12. In some instances it may be beneficial to have a single plate and stem arranged to both drive a flange further into a groove to move the inner seat into contact with the gate and have the same plate and stem arranged to move the flange within the groove so as to release the inner plate from contact with the gate.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A valve seal comprising:
   an outer seat, an inner seat, a stem, a gate, and a flange,
   wherein the inner seat is concentric with the outer seat, and at least a portion of the inner seat is within an interior bore of the outer seat and is axially movable about an axis of the outer seat,
   wherein the flange is tapered along at least a portion of its length,
   a groove formed between the inner seat and the outer seat,
   wherein a tapered portion of the flange is within the groove,
   wherein the stem is coupled to both the flange and the gate such that moving the stem radially between a stem first position and a stem second position moves the flange radially between a flange first position and a flange second position,
   further wherein moving the flange between the flange first position and the flange second position provides a force to move the inner seat axially into and out of contact with the gate.

2. The valve seal of claim 1 wherein, the groove is tapered along a portion of its length.

3. The valve seal of claim 2 wherein, the groove taper matches the flange taper.

4. The valve seal of claim 1,
   wherein, the stem moves the gate between a gate first position and a gate second position.

5. The valve seal of claim 4 wherein, the stem moves the flange between the flange first position and the flange second position after moving the gate between the gate first position and the gate second.

* * * * *